United States Patent [19]
Wlodarczyk

[11] Patent Number: 5,421,195
[45] Date of Patent: Jun. 6, 1995

[54] FIBER OPTIC MICROBEND SENSOR FOR ENGINE KNOCK AND MISFIRE DETECTION

[76] Inventor: Marek T. Wlodarczyk, 6865 Vachon Dr., Bloomfield Hills, Mich. 48301

[21] Appl. No.: 87,631
[22] Filed: Jul. 1, 1993
[51] Int. Cl.⁶ .............................................. G01L 1/24
[52] U.S. Cl. ................................ 73/115; 250/227.16; 73/705
[58] Field of Search .................. 73/35, 115, 116, 650, 73/653, 655, 657, 705, 708, 800, 862, 624, 766, 4 R; 356/32; 250/227.16

[56] References Cited

U.S. PATENT DOCUMENTS

| | | | |
|---|---|---|---|
| 4,459,477 | 7/1984 | Asawa et al. | 73/705 |
| 4,781,059 | 11/1988 | Suzuki et al. | 73/117.3 |
| 4,919,099 | 4/1990 | Extance et al. | 123/425 |
| 4,924,970 | 5/1990 | Wlodarczyk | 128/667 |
| 4,932,262 | 6/1990 | Wlodarczyk | 73/705 |
| 4,932,263 | 6/1990 | Wlodarczyk | 73/705 |
| 4,964,294 | 10/1990 | Kawajiri et al. | 73/358 |
| 5,052,214 | 10/1991 | Dils | 73/35 |

FOREIGN PATENT DOCUMENTS

| | | | |
|---|---|---|---|
| 0392650 | 10/1990 | European Pat. Off. | |
| 2204679 | 11/1988 | United Kingdom | 250/227.16 |
| WO8911031 | 11/1989 | WIPO | |

OTHER PUBLICATIONS

"Microbending Losses of Metal Coated Single Mode, . . . "; Society of Photooptical Instrumentation Engineers; vol. 985 (1988).

"A Fiberoptic Sensor for Combustion Pressure Measurement"; Society of Photooptical Instrumentation Engineers, vol. 840 (1987).

*Primary Examiner*—Robert Raevis
*Attorney, Agent, or Firm*—James M. Deimen

[57] ABSTRACT

A washer configuration fiber optic sensor comprising radial ridges in the cavity between the washer halves and an optical fiber spiralled to a terminating end within the cavity. The terminating end is mirrored and an optical filter is inserted in the fiber path adjacent the fiber entrance to the washer. Changing compression loads on the washer microbend the fiber and modulate the measuring light beam admired to the fiber and reflected back through the fiber. The optical filter is located in a connection between the washer and a transmitting fiber. The transmitting fiber both delivers light to the washer and collects light back from the washer. The connector is configured to deliver the measuring light beam to both the core and cladding of the fiber in the washer. However, the connector is configured to strip away the portion of the reflected light beam otherwise delivered to the cladding of the transmitting fiber. A reference light beam of differing wavelength is reflected by the filter. The overall result is enhanced discrimination over noise in the sensor.

11 Claims, 11 Drawing Sheets

FIBER OPTIC MICROBEND SENSOR FOR ENGINE KNOCK AND MISFIRE DETECTION

BACKGROUND OF THE INVENTION

The field of the invention pertains to fiber optic sensors instantaneously sensitive to pressure or stress in a manner that causes a beam of light passing through the sensor to be modified in response to changes in pressure or stress on the sensor.

In particular, in the automotive field, the ability to continuously monitor internal combustion engines for pressure fluctuations can significantly improve engine efficiency, performance, reliability and operating costs. Most importantly, the level of emissions can be reduced over the 100,000 mile effective life of the engine emissions control systems to be required by the United States Environmental Protection Agency. In addition, open and closed loop controls based on pressure information permit lean-burn engine operation, a wider tolerance to fuel octane and acceptance of alternative fuels.

Two combustion parameters, engine knock and misfire, have a particularly significant effect on overall engine performance. Combustion knock causes increased fuel consumption, reduced engine torque and engine deterioration if left uncorrected. Eventually severe damage such as perforated pistons can occur.

Misfire can result in catalyst damage and degradation that eventually cause vehicle exhaust emissions to no longer meet current or proposed emission standards. With a design 100,000 mile catalyst life, the failure to detect and correct misfire could result in operation of the vehicle for a lengthy period of time, possibly many years, with an ineffective catalyst.

The California Air Resources Board has recently proposed regulations which will require vehicles to be equipped with on-board emission monitoring systems. Such systems, in particular, will require misfire monitoring. The Environmental Protection Agency is also considering regulations to require such monitoring systems.

A low cost, reliable cylinder-selective combustion pressure sensor would permit knock and misfire detection separately for each cylinder. In addition to signalling the malfunction to the vehicle operator, a real time solid state engine control could adjust specific cylinder parameters to correct for the malfunction. The majority of the presently available or proposed knock and misfire detection techniques provide information that is not cylinder specific and therefore has limited utility for real time corrective controls. However, some recent patents disclose cylinder specific sensors. These sensors generally fall into two categories, luminosity detectors and pressure detectors.

U.S. Pat. No. 4,919,099 discloses a probe insertable into the engine cylinder combustion chamber. The probe includes a light conductive rod and fiber optic transmission bundle connected to an opto-electronic detector for instantaneous detection of the luminosity of the combustion gases within the combustion chamber. U.S. Pat. No. 5,052,214, in a similar manner, utilizes a fiber optic probe and transmission cable to sense and transmit the instantaneous luminosity to an opto-electronic detector. International Application Publication WO 89/11031 and European Application Publication EP-392-650-A also disclose optical luminosity probes for engine combustion chambers.

U.S. Pat. No. 4,781,059 discloses an optical fiber pressure sensor comprising a plurality of fibers to transmit light to the sensor tip and a second plurality of fibers to transmit light from the tip to an opto-electronic detector. The tip comprises a reflective diaphragm sensitive to pressure changes within the combustion chamber. U.S. Pat. No. 4,924,870 to applicant discloses an optical fiber pressure sensor tip comprising a single optical fiber. The single fiber carries dual light beams of differing wavelengths as input and the reflected return light beams. One wavelength serves as a reference signal that is reflected by an optical filter. The other wavelength passes through the optical filter and is reflected and modulated by a moveable diaphragm sensitive to pressure changes. This particular fiber optic sensor is of very small size, being intended for the measurement of intra-vascular blood pressure in human patients.

Two other patents to the applicant, U.S. Pat. No. 4,932,262 and U.S. Pat. No. 4,932,263, disclose a well having an optical fiber passing therethrough. A pressure sensitive membrane encloses at least a portion of the well. The underside of the pressure sensitive membrane includes an optical grating that couples with the wavelength of the light beam in the optical fiber so as to modify the light beam in response to pressure induced movement of the membrane. By making the sensor with techniques common to the manufacture of integrated circuits on chips, the sensor may be made small and rugged enough to locate on a spark plug in direct exposure to the combustion chamber of an engine.

A published paper co-authored by the applicant is entitled "Microbending Losses of Metal Coated Single Mode, Multimode, and Cladding-Free Fibers," Society of Photo-Optical Instrumentation Engineers, Vol. 985 Fiber Optic and Laser Sensors VI (1988) and discloses the test results of microbending various optical fiber constructions. The test results indicate the various attenuations of light beams as a function of microbending displacement of the fibers and wavelength of the light beams.

A second published paper co-authored by the applicant is entitled "A Fiber Optic Sensor for Combustion Pressure Measurement in a Washer Configuration," Society of Photo-Optical Instrumentation Engineers, Vol. 840 Fiber Optic Systems for Mobile Platforms (1987), and discloses a washer configuration for placement between a spark plug and engine cylinder head. Changes in combustion chamber pressure cause changes in the preload on the washer configuration. The washer configuration comprises upper and lower serrated washer halves with a continuous loop of optical fiber placed between the serrated washer halves. One end of the loop extends to a source of light and the other end of the loop extends to a photodetector.

SUMMARY OF THE INVENTION

The invention comprises a washer configuration sensor including radial ridges in the cavity between the washer halves and an optical fiber spiralled to a terminating end within the cavity. The terminating end is mirrored and an optical filter is inserted in the fiber path adjacent the fiber entrance to the washer. Changing loads on the washer microbend the fiber and modulate the measuring light beam admitted to the fiber and reflected back through the fiber.

The optical filter is located in a splice or connector between the washer and the transmitting fiber. The transmitting fiber both delivers light to the washer and collects light back from the washer. A reference light beam of differing wavelength is reflected by the filter. The splice or connector is configured to deliver the measuring light beam to both the core and cladding of the fiber in the washer. However, the splice or connector is also configured to strip away the portion of the reflected light beam otherwise delivered to the cladding of the transmitting fiber. The result is enhanced discrimination over noise in the sensor.

The sensor configuration is particularly suited to auto-correlation function analysis of the light and electric waveforms produced by the sensor. Thus, sensor offset and gain, calibration changes and aging changes can substantially be ignored.

DESCRIPTION OF THE PREFERRED EMBODIMENTS

Figure 1:
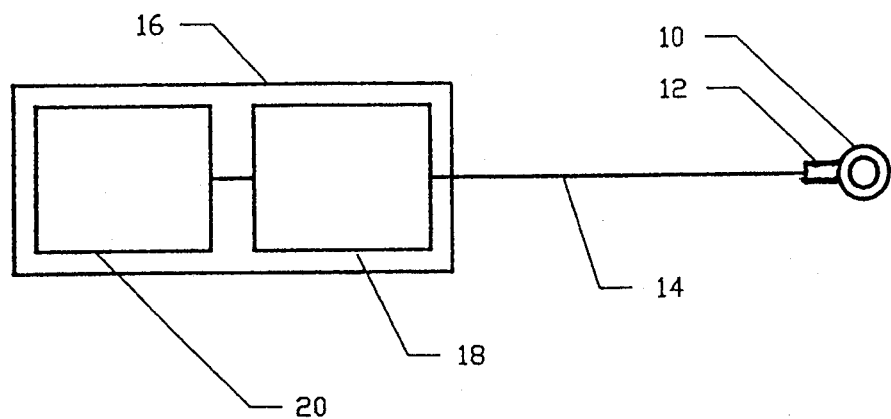
FIG. 1 is a schematic illustration of the major components of the fiber optic sensor.

In FIG. 1, the simplest Form of the fiber optic sensor gives the appearance of a simple metal washer 10 with a connector 12 and optical transmitting fiber 14 extending therefrom to a control box 16. Within the control box 16 is an opto-electronic transceiver 18 connected to the optical fiber and an electronics module 20 for the sensor.

Figure 2:
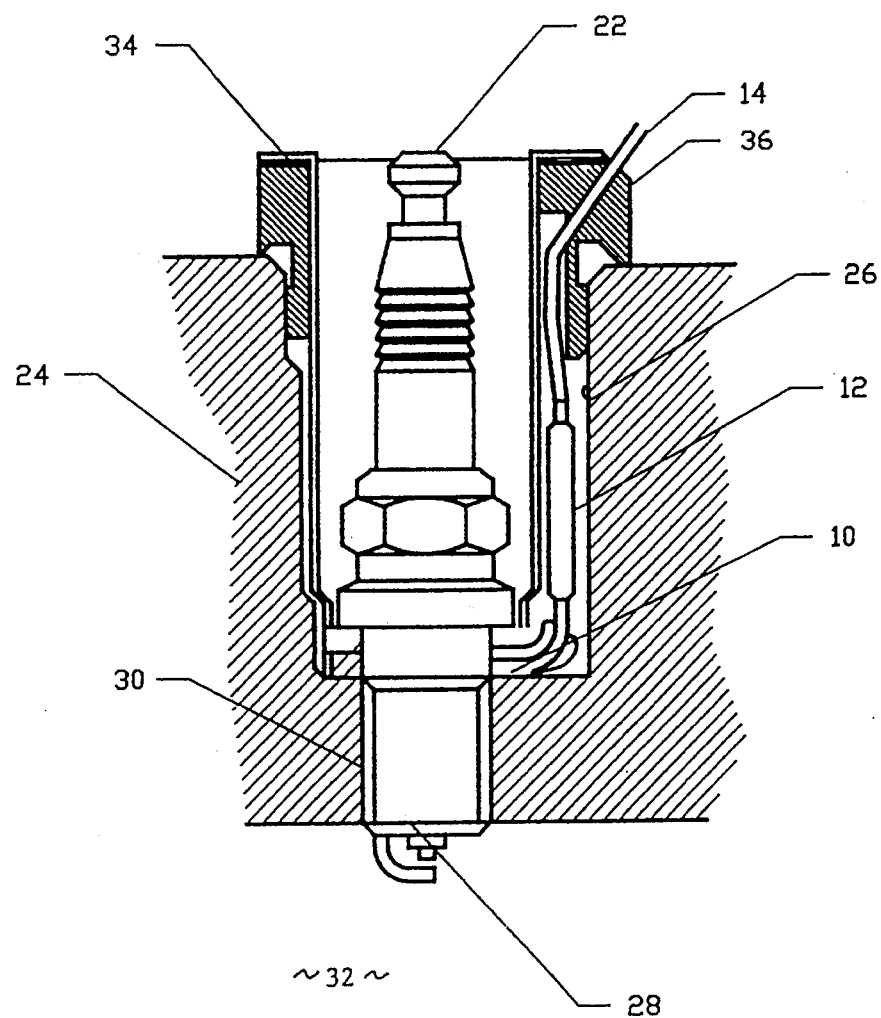
FIG. 2 is a partial cross-section of a fiber optic sensor installed in an engine cylinder head.

In FIG. 2, the sensor 10 is positioned between the spark plug 22 and cylinder head 24 of an engine. The spark plug 22 is normally positioned in a well 26 in the cylinder head 24 with the tip 28 of the spark plug extending through a threaded hole 30 into the combustion chamber 32. Within the well 26, a metal shield 34 surrounds the spark plug 22 and a rubber boot 36 seals the well outside of the metal shield. Within the well 26 and outside of the shield 34, the connector 12 and optical transmitting fiber 14 extend from the sensor 10 and through the boot 36. Other locations for the sensor, such as under an engine head bolt, might be selected. For example, piezoelectric knock sensors have been placed under engine head bolts.

In the installation of the spark plug 22 and sensor 10, the spark plug is tightened to a specified torque or preload. The sensor 10 is therefore also preloaded in this configuration. Thus, as the combustion pressure in the cylinder 32 rises to a maximum in normal operation, the preload on the sensor 10 is partially removed and then is restored as the combustion pressure falls.

Figure 3A:
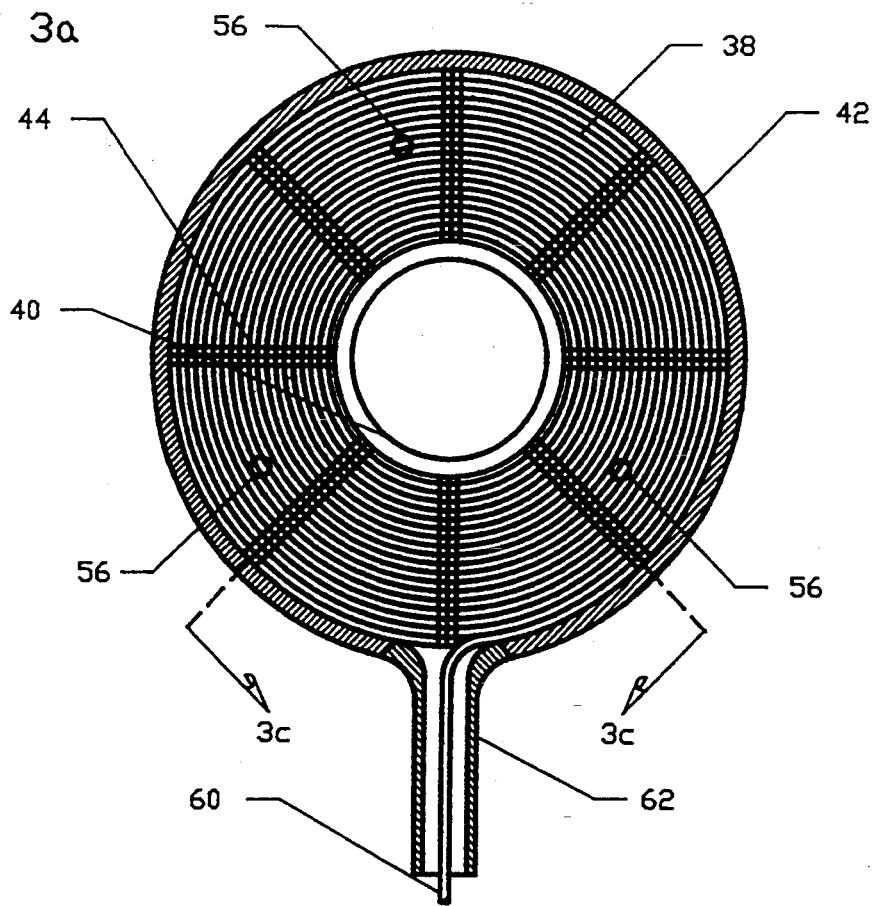
FIG. 3a is a plan view of the bottom washer or ring of the fiber optic sensor.
Figure 3B:
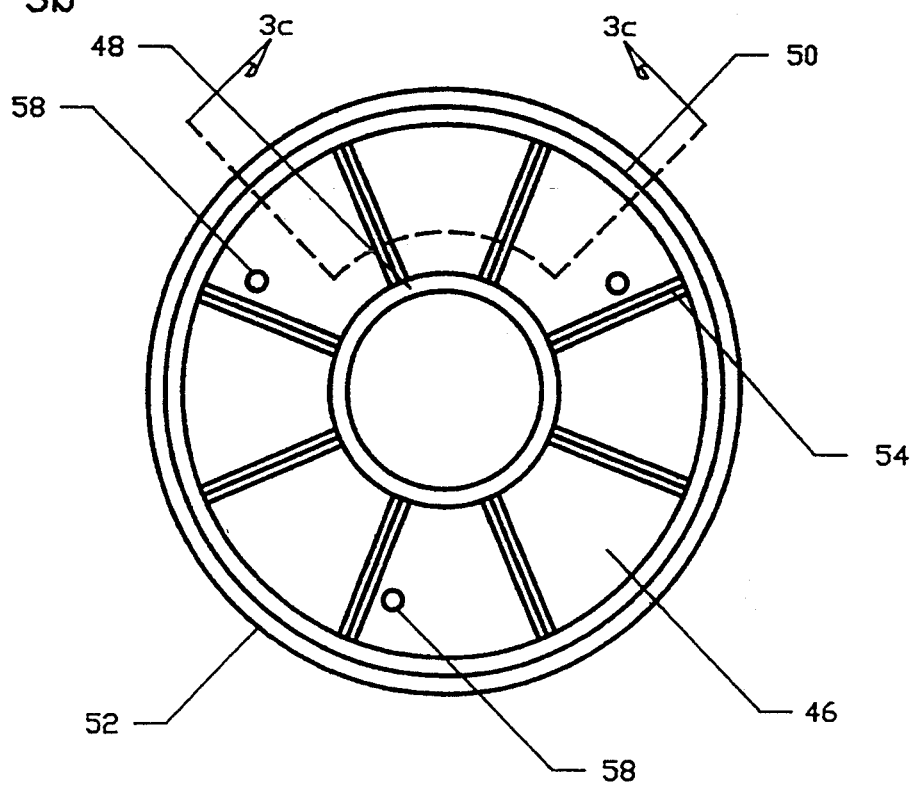
FIG. 3b is a plan view of the top washer or ring of the fiber optic sensor.
Figure 3C:
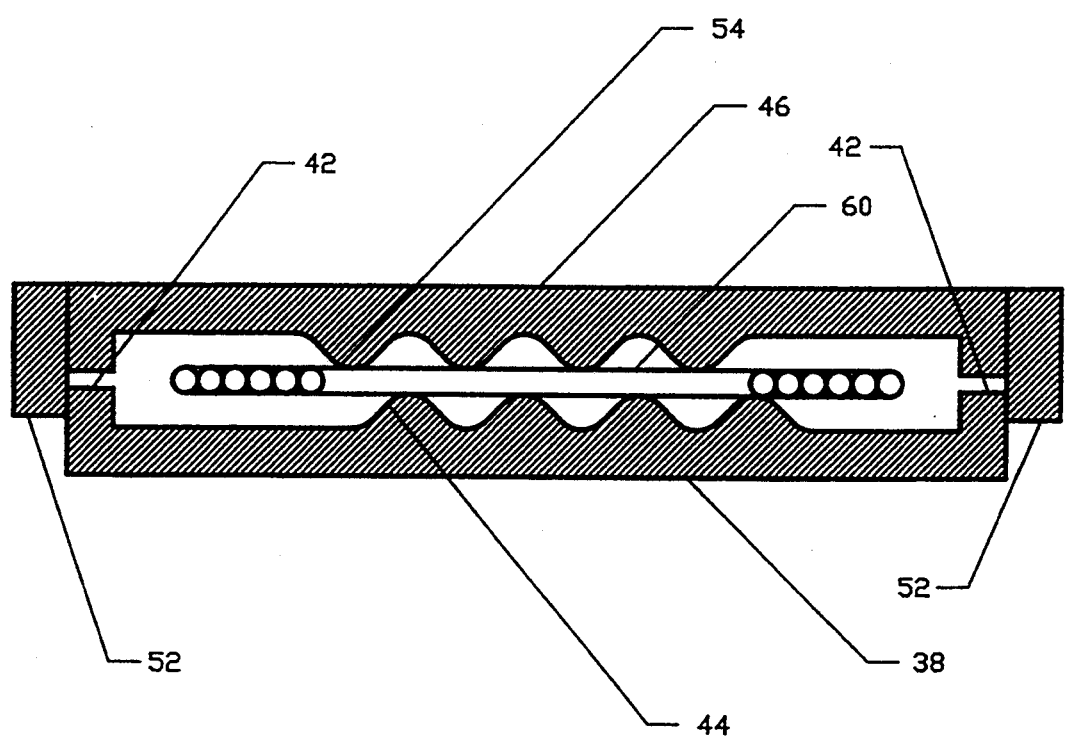
FIG. 3c is cross-sectional view of the fiber optic sensor taken along the line 3c of FIGS. 3a and 3b.
Figure 4:
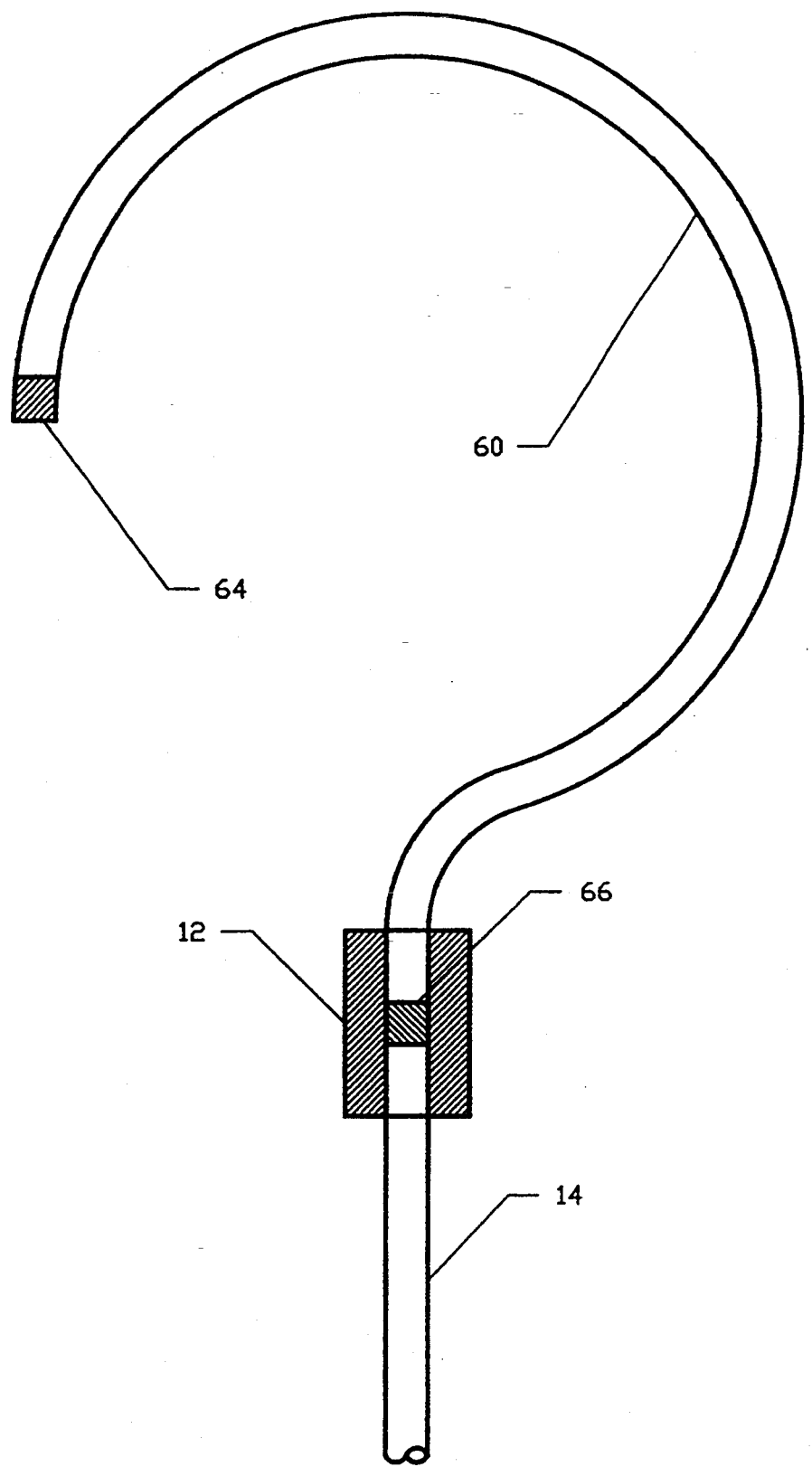
FIG. 4 is a plan view of a single turn sensing fiber.

The preferred configurations of the sensor 10 are as shown in FIGS. 3 and 4. In FIGS. 3a and 3c, the bottom of the sensor 10 comprises a lower flat ring 38 having raised inner 40 and outer 42 edges. Extending radially between the inner 40 and outer 42 edges are a plurality of microbending ridges 44. The ridges 44 extend from the upper surface of the flat ring 38. The raised edges 40 and 42 and ridges 44 may be formed integrally with the flat ring 38.

In FIG. 3b the upper flat ring 46 comprises an inner raised edge 48 and an outer raised edge 50. The inner 48 and outer 50 raised edges are at the same radii respectively as the raised edges 40 and 42 of the lower flat ring 38. Surrounding the upper flat ring 46 and outer raised edge 50 is a circumferential ridge 52 that forms an internal shoulder with the raised edge 50. Thus, the upper flat ring 46 fits over the lower flat ring 38 as a cap.

Extending radially between the inner 48 and outer 50 raised edges are a plurality of ridges 54. The ridges extend from the undersurface of the upper flat ring 46. As above, the raised edges 48 and 50, circumferential ridge 52 and ridges 54 may be formed integrally with the flat ring 46.

Extending from the lower flat ring 38 are a plurality of indexing pins 56. The upper flat ring 46 is formed with a set of sockets or holes 58 that complement the indexing pins 56 to assure that the ridges 54 of the upper flat ring 46 are rotationally spaced equally between the ridges 44 of the lower flat ring 38. The upper 46 and lower 38 rings together form a cavity within which is placed a fiber optic strand which forms the sensing fiber 60.

The height or distance the ridges 44 and 54 extend into the cavity in combination with the diameter of the sensing fiber 60 determine the amount of microbending of the fiber as it spirals about the cavity within the rings 38 and 46. Under design load or torque on the spark plug 22, the sensing fiber 60 "waves" as it spirals within the cavity, however, the raised edges 40 and 48, and 42 and 50 respectively are not in contact. To prevent damage from over-torquing the spark plug 22, the raised edges form mechanical stops to limit the microbending of the sensing fiber 60.

To provide access to the sensor 10 a tube 62 is fastened to the lower flat ring 38. The sensing fiber 60 passes from the cavity through the tube 62 to the connector 12 shown in FIG. 4. For simplicity in FIG. 4 the sensing fiber 60 is shown as a partial loop rather than the multiple turns in FIG. 3. The sensing fiber 60 is terminated by a reflecting mirror or coating 64 at the tip or distal end. At the connector or splice 12 a transverse transmissive and reflective coating 66 is located between the sensing fiber 60 and the optical transmitting fiber 14. The particulars of the connector or splice 12 are described in more detail with reference to FIG. 7 below.

Figure 5:
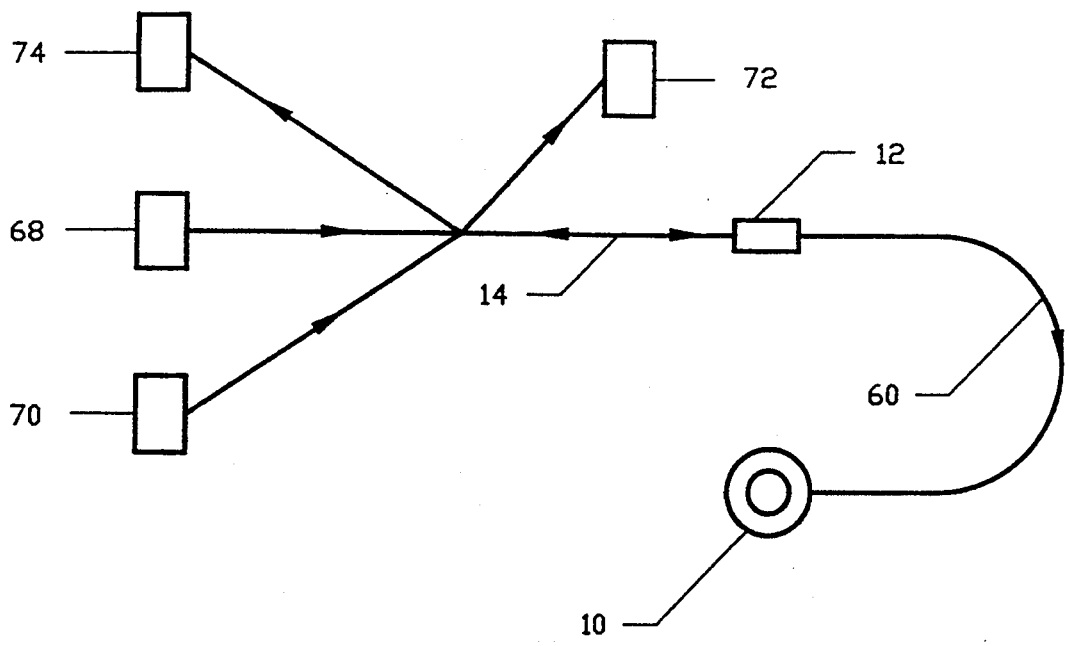
FIG. 5 is a schematic diagram of the fiber optic circuitry for the sensor.
Figure 6:
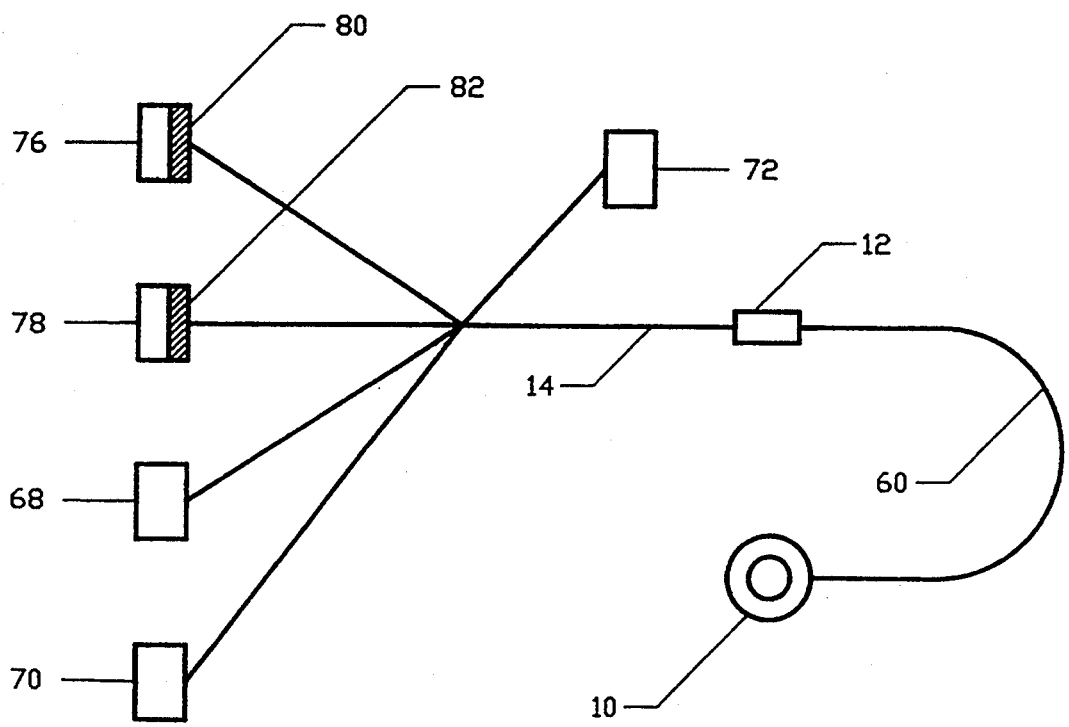
FIG. 6 is a schematic diagram of an alternative fiber optic circuit for the sensor.

FIGS. 5 and 6 illustrate in more detail two alternative modes of delivering and collecting the optical signals for the sensor 10. In FIGS. 5 and 6 a pair of Light Emitting Diodes 68 and 70 supply two substantially different wavelength signals to the transmitting fiber 14. The reference detector 72 monitors the light intensity of each diode and through suitable circuitry keeps the output of each diode substantially constant. Silicon Photodiodes are suitable detectors.

The transmissive and reflective coating 66 acts as a filter to permit the signal of one wavelength Ws to pass through into the sensing fiber 60 while reflecting the other signal Wr of different wavelength to act as a reference signal. Signal Ws is reflected by the coating 64 at the sensing fiber 60 distal end. With time division multiplexing (TDM) only one measuring detector 74 is required. However, for wavelength division multiplexing (WDM), two measuring detectors 76 and 78 each equipped with differing band pass optical filters 80 and 82 are required.

Distinguished from the inventor's previous microbending designs, is the novel use of a terminated single fiber strand in the microbending sensor 10. The terminated single fiber strand combined with an in-line inserted long pass optical filter described below in FIG. 7, makes the new sensor 10 relatively insensitive to undesired vibrations and temperature effects associated with the engine environment. Temperature effects on optical connectors, fibers, and sensing elements, and the bending loss susceptibility of optical fibers have been identified in the past as the main problem areas of intensity-encoded fiber optic sensors such as previous microbending sensors.

The new sensor 10 by propagating light in two directions with the terminating mirror coating 64 doubles the sensitivity in comparison with sensors having the light propagated in one direction only. The light is subjected to microbending losses a second time in the reflected return path through the sensing fiber 60. In addition, the sensing fiber is reduced in length and fewer optical connections are required with the new sensor design.

Figure 7A:
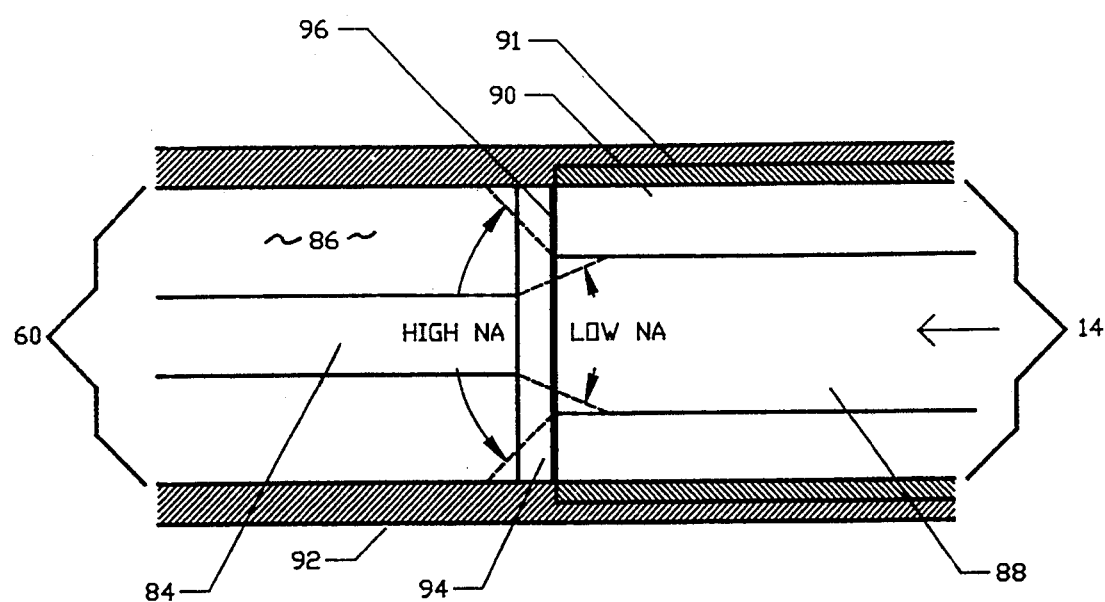
FIG. 7a is a cross-section illustrating a splice between the sensing fiber and the transmitting fiber.
Figure 7B:
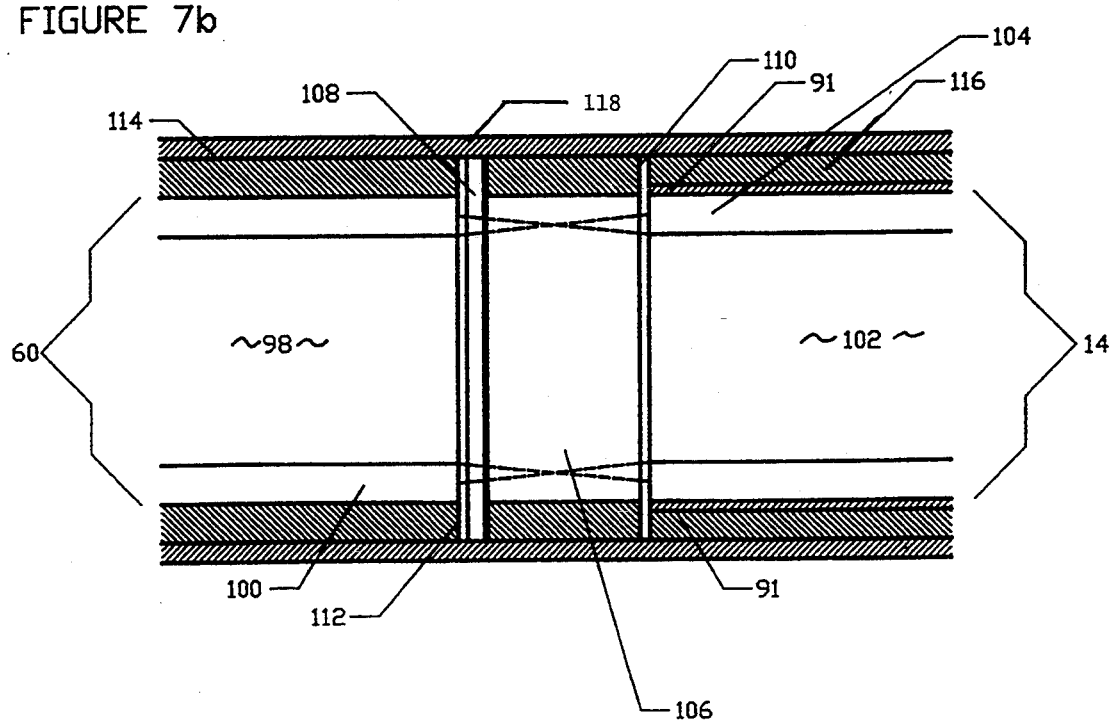
FIG. 7b is a cross-section illustrating a connector between the sensing fiber and the transmitting fiber.

FIGS. 7a and 7b illustrate alternative forms of the optical connector 12. A long pass optical filter, such as a dielectric coating filter is used. In FIG. 7a, the sensing fiber 60 comprises a relatively small diameter core 84 and relatively thick cladding 86. In comparison, the transmitting fiber 14 comprises a relatively large diameter core 88 and relatively thin cladding 90. A splice protecting sleeve 92 surrounds the fibers 14 and 60 at the connection. The dielectric coating filter 94 is directly deposited on the end of the sensing fiber 60 and a thin layer of optical epoxy 96 joins the fibers together.

In FIG. 7b, the sensing fiber 60, core 98 and cladding 100 may be of the same respective diameters as the transmitting fiber 14 core 102 and cladding 104. Inserted between the fibers 14 and 60 is an optically transparent disc 106. Deposited on the disc 106 is the dielectric coating filter 108. Optical epoxy 110 and 112 is used to join the fibers 14 and 60 to the disc 106. Connector ferrules 114 and 116 surround the ends of the fibers 14 and 60 and an alignment sleeve 118 surrounds the ferrules 114 and 116 and the disc 106.

By positioning the coating filter 94 or 108 on the sensor side of the connector 12, temperature and vibration effects on the transmitting fiber 14 as well as the mechanical and thermal instabilities of the connector 12 will be reduced. This type of filter compensation for the detector is not applicable to one-directional or single pass light propagation in a sensor that is non-reflective.

Two differing types of optical fibers are used in the sensor design based on the connector shown in FIG. 7a wherein the dielectric coating filter 94 is directly deposited on the fiber 60 end face. For automotive engine use, the sensing fiber 60 must withstand temperatures as high as 200° C. and should withstand long term stress without degradation. A metal buffered fiber, or a polyamide buffered fiber, with a carbon hermetic coating are suitable. The transmitting fiber 14 should withstand engine compartment temperatures and other hazards within the compartment.

A new feature of the embodiment of FIG. 7a is the utilization of fibers of mismatched core sizes 84 and 88 and numerical apertures (NA), in turn resulting in increased microbending sensitivity of the sensing fiber 60. The small core 84 size of the sensing fiber 60 with a small NA joined to the large NA of the transmitting fiber core 88 causes a substantial portion of the light delivered from the transmitting fiber 14 to be propagated into the cladding 86 of the sensing fiber 60. The propagation of light into the cladding 86 results in making the sensing fiber 60 particularly bend sensitive. For example, the combination of a 0.29 NA, 50 micron core diameter with a 0.6 NA, 100 micron core diameter is suitable.

Conversely, for the return light signal reflected by the mirror coating 64, the mismatch of the fibers in the connector in FIG. 7a will result in increased sensitivity to environmental perturbations (noise) by the measuring signal relative to the reference signal reflected by the coating filter 94. To overcome the increased sensitivity to the environment a mode stripper is incorporated in the connector on the transmitting fiber side. The mode stripper eliminates the return propagation of cladding modes in the cladding 90 of the transmitting fiber 14 from the sensor 10 to the detectors 74 or 76 and 78.

The mode stripper may be in the form of an elongated connector section of the transmitting fiber 14 with the transmitting fiber covered by a light absorbent mode stripping material 91. A light absorbent epoxy with good adhesion to the fiber may be used. Enhanced mode stripping can be accomplished by slightly bending the fiber in the epoxy covered area.

In the embodiment of FIG. 7b the sensing fiber 60 and transmitting fiber 14 may be identical in core and diameter. The disc 106 acts as a support for the coating filter 108 and provides for increased light beam size launched into and propagated through the sensing fiber 60. The result is increased microbending sensitivity. This configuration requires a mode stripper 91 for the return signal such as described above and as shown can be incorporated into ferrule-based fiber connection.

Figure 8:
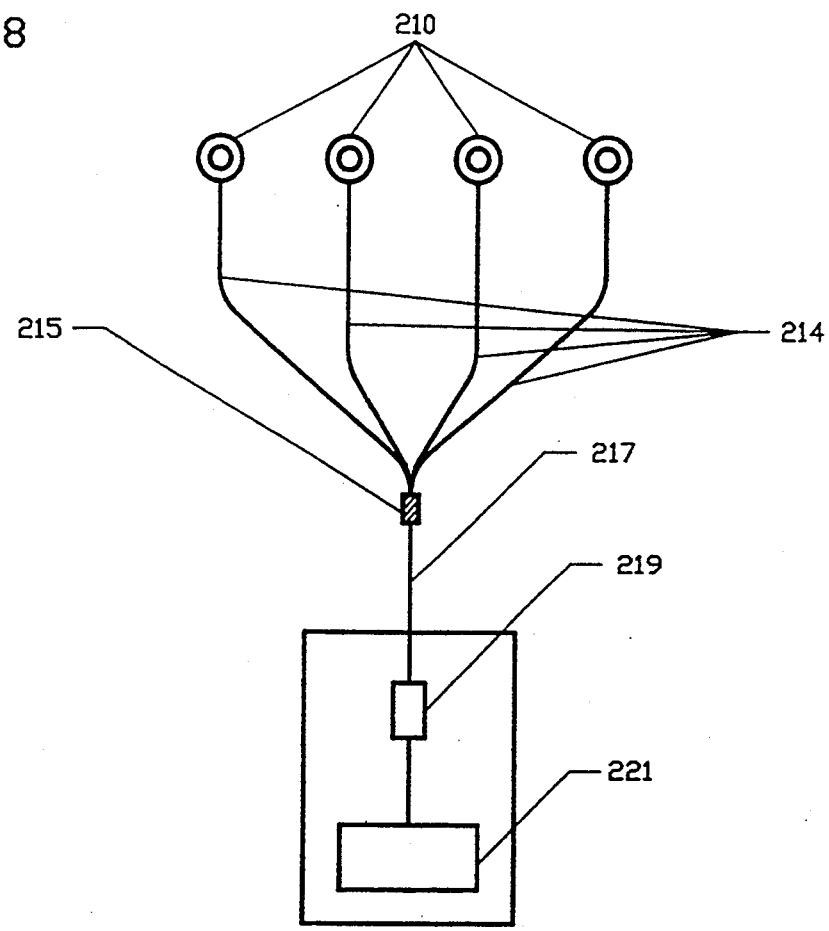
FIG. 8 is a schematic illustration of a single detector multiple fiber optic sensor circuit.

In the application of the sensor 10 clearly the simplest version is to apply one of the circuits shown in FIGS. 5 or 6 to a single cylinder engine. Where the application is to a multicylinder engine, one of the configurations shown in FIGS. 8 or 9 may be selected. The single detector multiple sensor embodiment illustrated in FIG. 8 for a four cylinder engine comprises four sensors 210 connected in parallel 214 to an optical fiber junction 215 and single transmitting fiber 217. The single transmitting fiber 21 7 leads to a single or double detector 219 depending upon TDM or WDM multiplexing. The output of the detector 219 comprises a string of waveforms representing the rise and fall of pressure in each cylinder with any knock or misfire being super-imposed on the waveforms. The amount of overlap of waveforms cylinder by cylinder that can be tolerated before the overlap destroys the ability of the electronic control module (ECM) 221 to analyze the waveforms for knock and misfire determines the number of cylinders that can be accommodated by an individual detector. Thus, two or more detectors might be required for an eight or ten cylinder engine. Maximum engine speed is also an important factor in the determination of the number of detectors required.

Misfire and knock are detected by comparing pressure readings just before and just after top dead center of the compression stroke. The number of degrees of crank angle before and after top dead center is determined by the waveform overlap of the preceding and trailing cylinders. Identification of the misfiring or knocking cylinder is thus derived from crank angle position available to the ECM 221 from a crankshaft or fly wheel speed and rotational position detector.

Figure 9:
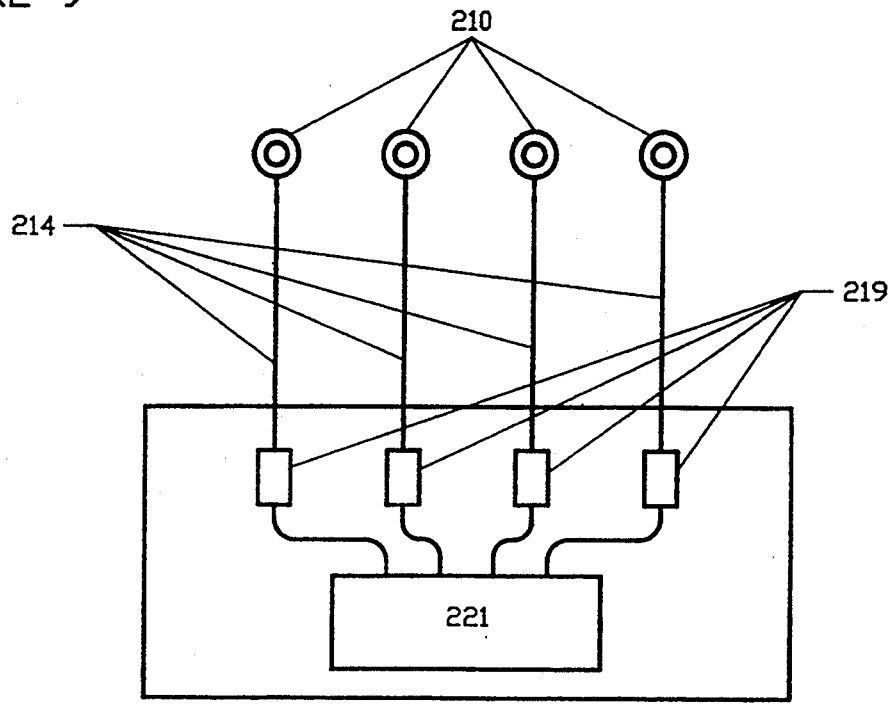
FIG. 9 is a schematic illustration of a multiple detector multiple fiber optic sensor circuit.

The alternative multi-cylinder configuration illustrated in FIG. 9. increases costs and complexity by dedicating a detector 219 to each sensor 210. Thus, no waveform overlap occurs in the detector 219. This embodiment can be used for more involved applications, beyond misfire and knock, such as lean burn engine controls because combustion in each engine cylinder can be separately optimized on a real time basis for maximum fuel efficiency and minimum pollutant emissions.

Figure 10A:
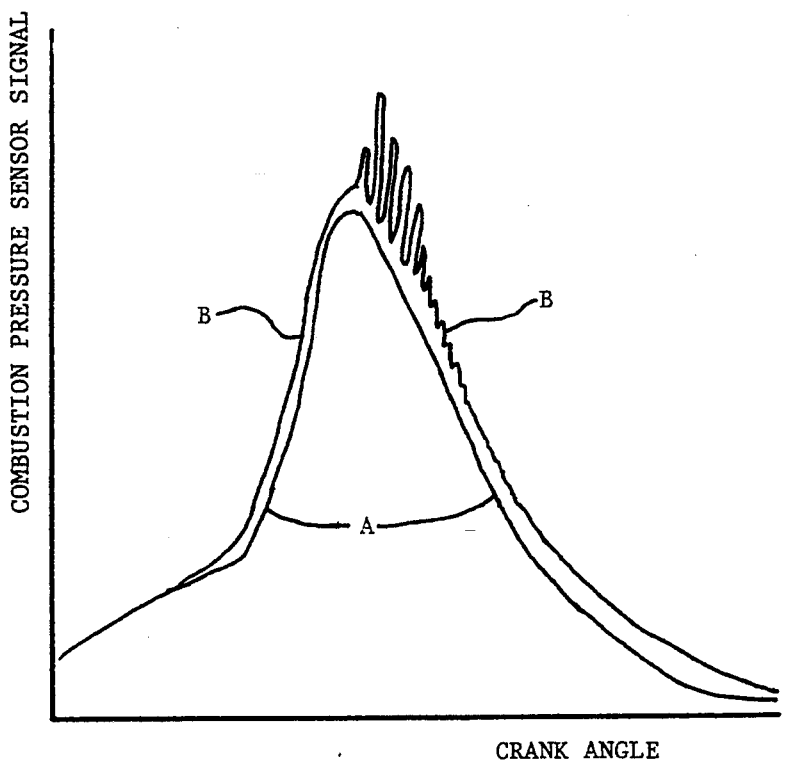
FIGS. 10a and 10b illustrate the effect of knock on the cylinder pressure waveform.
Figure 10B:
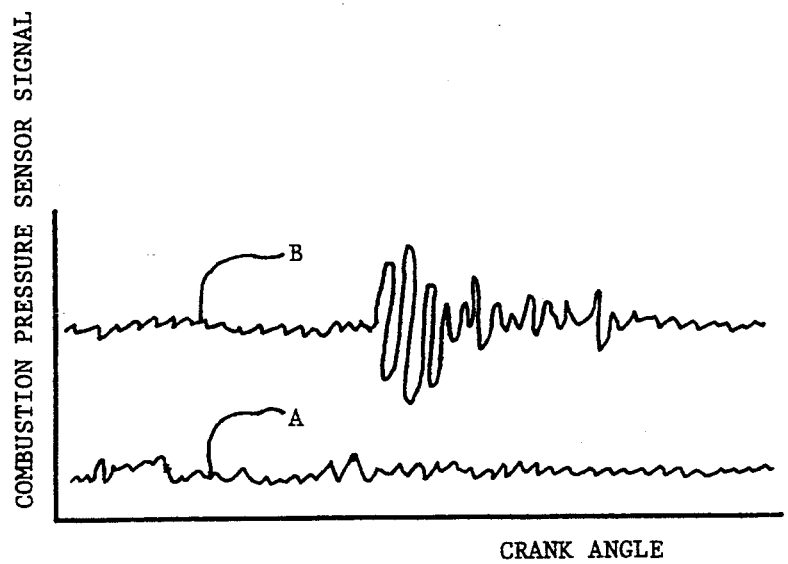

FIGS. 10 and 11 illustrate respectively the superposition of the knock signal on the pressure waveform and the misfire displacement or dip of a portion of the pressure waveform. Thus, in FIG. 10a curve A is the typical or expected waveform for combustion pressure in the cylinder and curve B exhibits the effect of knock on the waveform. Knock clearly causes a relatively high frequency pressure fluctuation which can with suitable electronic analysis in the ECM be isolated and amplified as shown by the comparison of curves A' and B' in FIG. 10b.

Figure 11A:
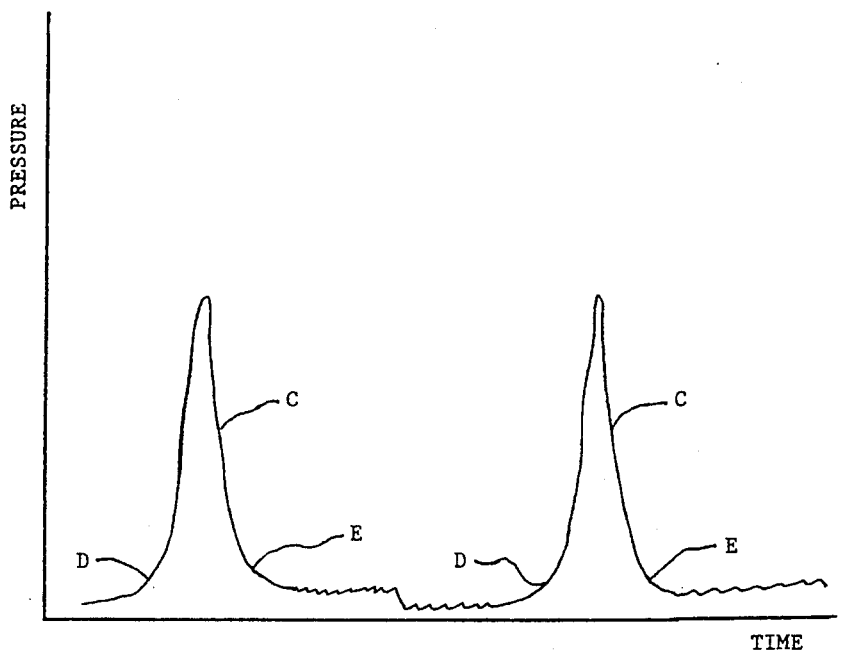
FIGS. 11a and 11b illustrates the effect of misfire on the cylinder pressure waveform.
Figure 11B:
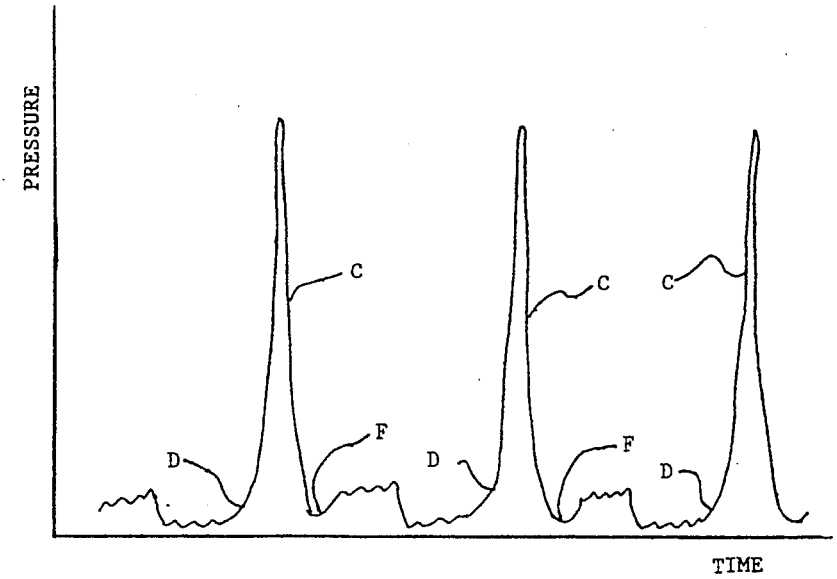

In FIG. 11a a multiple pressure waveform for cylinder pressure is illustrated by curve C. The "knee" at the beginning D and end E of each compression and combustion stroke are substantially similar in shape (substantially symmetric about the peak of curve C). In FIG. 11b, however, the symmetry of curve C about the peak is lost at the "knees". Rather, a pronounced displacement downwardly or dip is exhibited at F in the knee of the curve following the peak.

For knock or misfire detection an auto-correlation technique can uniquely identify knock or misfire. In the absence of knock or misfire, the output of the auto-correlation function applied to the pressure waveform stored in memory in the ECM and the waveform of a particular cylinder results in essentially a zero value. In the presence of knock or misfire, the normalized output of the auto-correlation function approaches unity resulting in the unique detection of either or both of the two combustion anomalies. The physical embodiment of the auto-correlation function can be realized in digital form using Digital Signal Processing integrated circuits which offer the capabilities of sufficiently high speed real time auto-correlation calculations.

With certain modifications described below the microbend sensor may be used as a vibration sensor. Vibration in an internal combustion engine may result from several different sources including misfire, knock, improper timing, worn bearings, improper balancing and general deterioration of the engine. Under otherwise optimized combustion, the presence of engine vibrations may serve as an early warning of engine deterioration.

Figure 12:
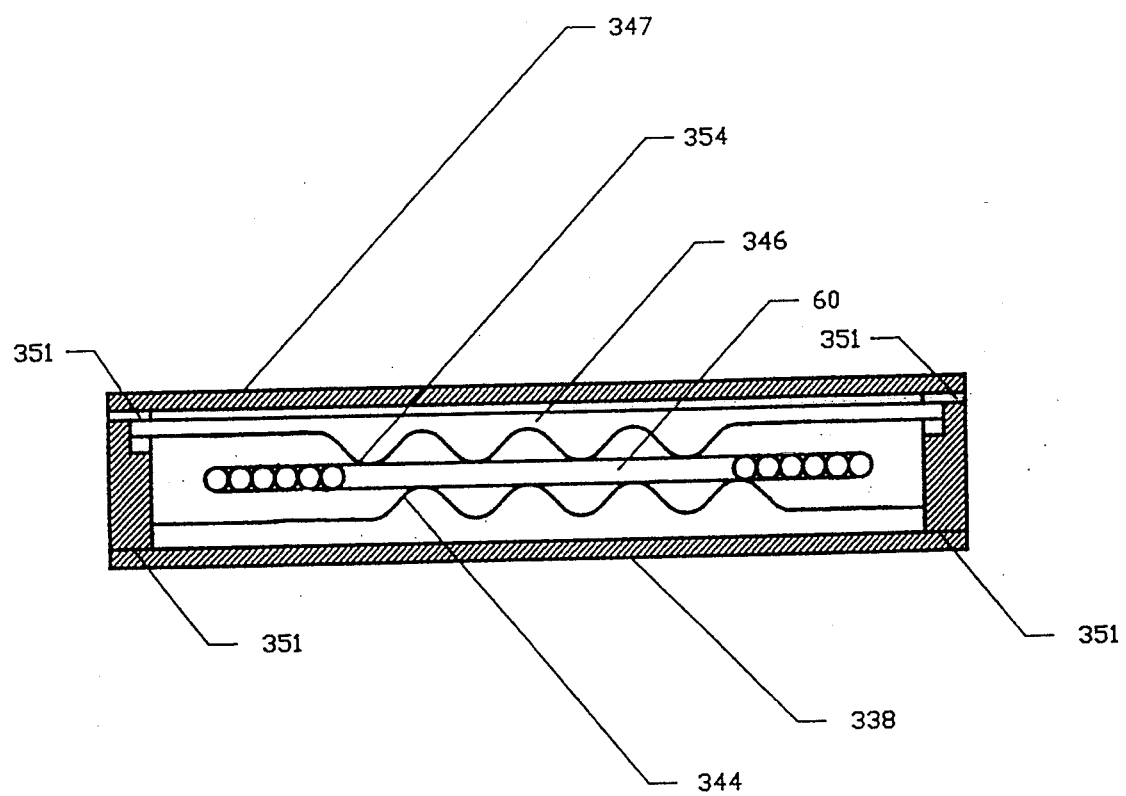
FIG. 12 illustrates in cross-section an engine vibration sensing modification of the fiber optic sensor.

The modifications of the washer microbend sensor for vibration detection comprise changes in washer or ring stiffness and rigidity as illustrated in FIG. 12. The cross-section shown is analogous to that shown in FIG. 3c. The modifications can be accomplished by changes in washer or ring thickness and the addition of a protective cap.

For vibration detection the upper ring 346 should be relatively thin with a characteristic resonance frequency exceeding the required frequency response of the sensor. The bottom ring 338 should be very rigid and not substantially deflect under compression load. The radial ridges 344 and 354 otherwise are substantially like those above described for pressure sensing. The upper ring should be covered by a rigid protective cap 347 attached permanently 351 to the bottom ring of the sensor. The vibration sensor as shown may be inserted under a spark plug as with the above knock and misfire sensor or positioned under a bolt head on the engine block.

Alternatively, the vibration sensor can be in a cavity in a bolt head. The vibration sensor can also be combined with the knock and misfire pressure sensor by stacking the two sensors as a permanent assembly welded together and placed under a spark plug or bolt. The double sensor is effectively a thick washer. As another alternative the misfire and knock sensor may be placed under the vibration sensing bolt head.

A distinctive advantage to the sensors disclosed above is the measurement of relative changes in pressure or vibration above background noise in the system and expected changes or normal changes in the system. Thus, the sensors can be made relatively inexpensively and do not require calibration in use. Only an initial inspection or calibration as part of the manufacturing and installation process may be required.

A critical requirement for a commercially viable misfire and knock detection system is low cost. While the cost of the washer type sensor above can be very low the total system cost must be acceptably low. When a conventional opto-electronic coupler is used the cost may be unacceptably high because the opto-electronic coupler is the most expensive part of the transceiver.

Such a transceiver comprises one or more light emitting diodes (LED's) and one or more photodiodes. Presently available bi-directional opto-electronic couplers are unacceptably expensive for low cost automotive applications. LED's may be also expensive if their beam sizes are small, as typically required for conventional couplers.

Figure 13:
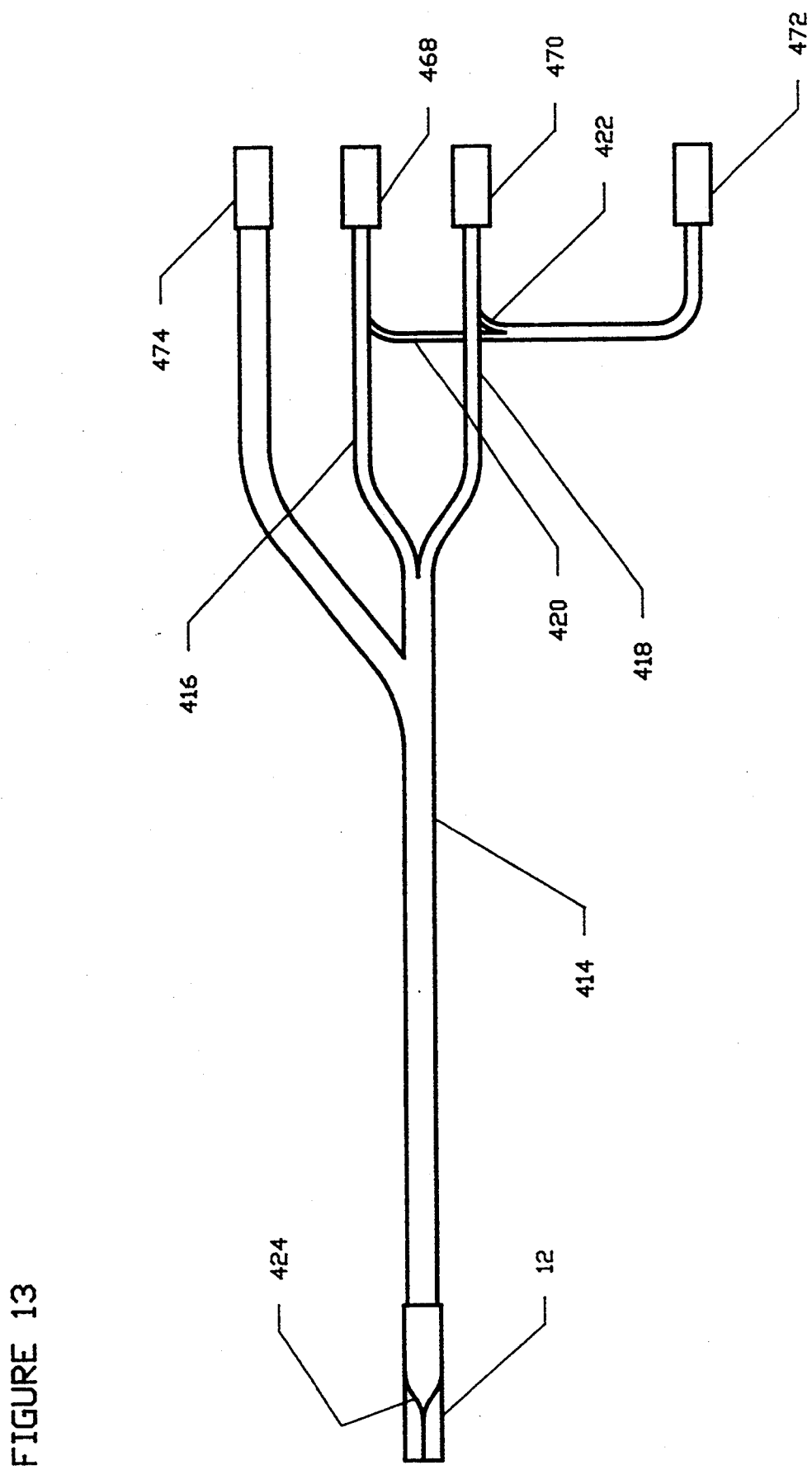
FIG. 13 illustrates an advantageous transmitting fiber bundle.

A low cost and effective solution for the opto-electronic coupler is illustrated in FIG. 13. This solution can offer virtually the same optical power as much more expensive couplers, permits the use of individual low cost LED's, and individual low cost photodiodes. The basis of the solution is the use of low cost borosilicate fiber bundles tapered into the connector 12 at the sensing fiber end and a divisional arrangement of the fibers at the optoelectronic coupler end.

As shown in FIG. 13 the fiber bundle 414 extending from the connector 12 is divided at the coupler end into dedicated subgroups for each opto-electronic element. For example, eight fibers 416 extend to LED 468 and another eight fibers 418 extend to LED 470. Sixteen fibers extend to the photodiode in the measurement detector 474. Three fibers 420 and 422 from each LED 468 and 470 extend directly to the reference detector 472. With such an arrangement the light from the LED's is efficiently coupled into the transmitting fiber 414 as a fiber bundle and into and from the sensing fiber.

As an example, 50 micron borosilicate fibers (extensively used in fiber optics) may be utilized. Depending on LED and sensing fiber sizes, as many as 100 fibers can be used in the transmitting fiber bundle. Alternatively, larger (150 micron) diameter and fewer fibers can be used. Regardless of the number of fibers, the fibers in the fiber bundle 414 that transmit light from the LED's and return light to the measurement detector 474 are fused and tapered 424 at the connector 12 end to a diameter suitable for matching with the sensing fiber. Such a taper, which may be fabricated in a straight forward way by thermal fusing of borosilicate fibers and pulling during fusing is important to efficient transition from a relatively large bundle size (possibly 500 microns in diameter) to a sensing fiber size (typically 100 to 200 microns in diameter). Without the taper, the size mismatch loss may reduce the returning optical signal to unacceptable levels.

The number of fibers in the subgroups connected to either the LED's or the photodiodes may be adjusted to optimize the power received by a photodiode. In effect, the number of fibers in each subgroup is determined by the maximum power to be received at the measurement detector. The various losses are distributed to obtain maximum received power even though some individual collection efficiencies such as at the LED's are compromised. Low cost LED's typically launch divergent and large light beams. Large bundles of fibers can be used to collect the light from the LED's. With borosilicate fibers having typically high numerical apertures of 0.5 to 0.6, the collection efficiency into a fiber bundle is enhanced. At the tapered end of the fiber bundle, taper loss is reduced by a metal coating over the taper and inside the connector 12.

I claim:

1. A fiber optic microbend sensor comprising a lower ring having a plurality of radial ridges extending upwardly and an upper ring having a plurality of radial ridges extending downwardly, said rings being concentric and said radial ridges alternating upwardly and downwardly, a clad sensing optical fiber extending in a spiral pattern between the rings and engaging the radial ridges, one end of the clad sensing optical fiber terminated with reflective means, the other end of the clad sensing optical fiber extending from the rings, whereby compression of the upper and lower rings together microbends the clad sensing optical fiber and modulates the light passing through the fiber, a clad transmitting optical fiber joined to the clad sensing optical fiber by connection means, said connection means comprising a partially reflective optical filter inserted between the clad sensing optical fiber and the clad transmitting optical fiber and, optical mode stripping means applied to the cladding of the transmitting optical fiber, said optical mode stripping means adjacent the connection means.

2. The microbend sensor of claim 1 wherein the partially reflective optical filter comprises a coating applied to the other end of the clad sensing optical fiber.

3. The microbend sensor of claim 1 including an optical disc interposed between the clad sensing optical fiber and the clad transmitting optical fiber wherein the partially reflective optical filter comprises a coating applied to the disc.

4. The microbend sensor of claim 1 wherein the optical mode stripping means comprises a light absorbent coating on the outside surface of a portion of the cladding of the clad transmitting optical fiber.

5. The microbend sensor of claim 1 including means to deliver light at at least two distinct wavelengths to the clad transmitting optical fiber.

6. The microbend sensor of claim 1 including means to detect light at at least two distinct wavelengths passing through the clad transmitting optical fiber.

7. The microbend sensor of claim 6 including means to analyze the light detected for modulation and means to compare the modulated light detected with a representative waveform stored in memory means.

8. The microbend sensor of claim 1 including means to detect light from the clad transmitting optical fiber, means to analyze the light detected for modulation and auto-correlation means to detect from the modulation multiple high frequency fluctuations in pressure impressed upon the descending slope of the combustion pressure stroke.

9. The microbend sensor of claim 1 including means to detect light from the clad transmitting optical fiber, means to analyze the light detected for modulation and auto-correlation means to detect from the modulation an excessive decrease in pressure at the knee of the descending slope of the combustion pressure stroke.

10. The microbend sensor of claim 1 including means to detect light from the clad transmitting optical fiber, means to analyze the light detected for modulation and auto-correlation means to detect from the modulation vibrational amplitudes of at least one of the rings in excess of a predetermined value.

11. The microbend sensor of claim 1 wherein one of the rings is relatively rigid and the other ring is relatively flexible, the characteristic resonance frequency of the flexible ring assembled against the clad sensing optical fiber exceeding the required frequency response to vibration, and a relatively rigid cap covering the flexible ring.

* * * * *